United States Patent
Takhmar et al.

(10) Patent No.: US 11,858,549 B2
(45) Date of Patent: Jan. 2, 2024

(54) SYSTEM AND METHOD FOR BLENDING DRIVER AND AUTOMATED STEERING COMMANDS FOR LATERAL CONTROL

(71) Applicant: GM GLOBAL TECHNOLOGY OPERATIONS LLC, Detroit, MI (US)

(72) Inventors: Amir Takhmar, Toronto (CA); Joshua M. Levin, Toronto (CA); Jimmy Zhong Yan Lu, Markham (CA); Jayant Sachdev, Toronto (CA); Reza Zarringhalam, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 386 days.

(21) Appl. No.: 17/093,023

(22) Filed: Nov. 9, 2020

(65) Prior Publication Data

US 2022/0144341 A1 May 12, 2022

(51) Int. Cl.
*B62D 15/02* (2006.01)

(52) U.S. Cl.
CPC .................. *B62D 15/025* (2013.01)

(58) Field of Classification Search
CPC ............................ B62D 15/025; B62D 6/00
USPC ........................................................ 701/41
See application file for complete search history.

(56) References Cited

U.S. PATENT DOCUMENTS

2008/0262676 A1* 10/2008 Kawakami ........... B62D 15/029
  701/41
2017/0137055 A1* 5/2017 Hirate .................... B62D 6/008

FOREIGN PATENT DOCUMENTS

JP         2017189994 A  * 10/2017

OTHER PUBLICATIONS

JP-2017189994-A—English Translation (Year: 2016).*

* cited by examiner

*Primary Examiner* — Scott A Reinbold
(74) *Attorney, Agent, or Firm* — Lorenz & Kopf LLP (57) ABSTRACT

A method for generating a steering command for controlling a vehicle is provided. The method includes: generating a first vehicle steering control torque command by a steering controller in the vehicle while the vehicle is driven in a semi-autonomous mode; generating an impedance-adjusted vehicle steering angle command based on a first vehicle steering angle command that was generated to compensate for a trajectory error, and a measured driver steering torque command generated in response to navigation of the vehicle using a steering wheel; generating an impedance-adjusted vehicle steering control torque command by the steering controller in the vehicle based on a difference between the impedance-adjusted vehicle steering angle command and a measured vehicle steering angle command; generating a steering command by a power steering system in the vehicle based on the measured driver steering torque command and the impedance-adjusted vehicle steering control torque command; and operating the vehicle in accordance with the steering command.

20 Claims, 3 Drawing Sheets

SYSTEM AND METHOD FOR BLENDING DRIVER AND AUTOMATED STEERING COMMANDS FOR LATERAL CONTROL

TECHNICAL FIELD

The technology described in this patent document relates generally to systems and methods for generating steering commands for land driven vehicles and more particularly to systems and methods for generating steering commands that blend driver generated steering inputs and computer-generated steering inputs.

Recent years have seen significant advancements in autonomous and semi-autonomous driving features in land driven vehicles, such as Super Cruise (a hands-free semi-autonomous driver assistance feature that uses high-definition maps and sensors watching the road to assist with steering, accelerating, and decelerating a vehicle), LKA (lane keeping assist, which is a semi-autonomous driving feature that assists with steering to keep a vehicle centered in a lane), and others. Vehicles may still be improved in a number of respects.

Semi-autonomous lateral control features, such as LKA and Super Cruise, share the job of steering a vehicle with a driver. Semi-autonomous lateral control features, however, may oppose an intended vehicle maneuver manually initiated by a driver. For example, a lane keeping or centering feature may inconveniently oppose the intended maneuvers of the driver and prevent the driver from holding an intended offset from lane center without overriding the lane keeping or centering feature. In such cases, it may be necessary to disengage a semi-autonomous control feature when the feature opposes an intended vehicle maneuver manually initiated by a driver. After completing the intended manual maneuver, the driver often must reengage the semi-autonomous control feature if continued use of the feature is desired.

Accordingly, it is desirable to provide systems and methods for blending driver generating steering inputs and computer generating steering inputs without disengaging semi-autonomous drive features. Furthermore, other desirable features and characteristics will become apparent from the subsequent detailed description and the appended claims, taken in conjunction with the accompanying drawings.

SUMMARY

Systems and methods for blending manual steering control with a driver assist or semi-autonomous driving feature without disengaging the driver assist or semi-autonomous driving feature are provided. In one embodiment, a method for generating a steering command for controlling a vehicle during vehicle operations is provided. The method includes: generating a first vehicle steering control torque command by a steering controller in the vehicle while the vehicle is driven in a semi-autonomous mode; generating an impedance-adjusted vehicle steering angle command based on a first vehicle steering angle command that was generated to compensate for a trajectory error, and a measured driver steering torque command generated in response to navigation of the vehicle using a vehicle steering wheel; generating an impedance-adjusted vehicle steering control torque command by the steering controller in the vehicle based on a difference between the impedance-adjusted vehicle steering angle command and a measured vehicle steering angle command; generating a steering command by a power steering system (e.g., EPS) in the vehicle based on the measured driver steering torque command and the impedance-adjusted vehicle steering control torque command; and operating the vehicle in accordance with the steering command.

In one embodiment, the generating an impedance-adjusted vehicle steering angle command includes determining the impedance-adjusted vehicle steering angle command based on the equation: $M(\ddot{\theta}_r - \ddot{\theta}_d) + B(\dot{\theta}_r - \dot{\theta}_d) + K(\theta_r - \theta_d) = \tau_D$, wherein M, B, K are tunable control parameters, $\tau_D$ is the measured driver steering torque command, $\theta_d$ is the vehicle steering angle command, and $\theta_r$ is the impedance-adjusted vehicle steering angle command.

In one embodiment, the generating an impedance-adjusted vehicle steering angle command includes determining the impedance-adjusted vehicle steering angle command based on the s-domain equation:

$$\theta_r = \theta_d + \frac{1}{Ms^2 + Bs + K}\tau_D,$$

wherein M, B, K are tunable control parameters, $\tau_D$ is the measured driver steering torque command, $\theta_d$ is the vehicle steering angle command, and $\theta_r$ is the impedance-adjusted vehicle steering angle command.

In one embodiment, the generating an impedance-adjusted vehicle steering angle command includes determining the impedance-adjusted vehicle steering angle command based on the following discrete time implementation equations:

$$\ddot{\theta}_r^{k+1} = \ddot{\theta}_d^{k+1} + \frac{1}{M}\left(\tau_d^{k+1} - B(\dot{\theta}_r^k - \dot{\theta}_d^k) - K(\theta_r^k - \theta_d^k)\right);$$

$$\dot{\theta}_r^{k+1} = \dot{\theta}_r^k + \ddot{\theta}_r^{k+1} \Delta t;$$

and $$\theta_r^{k+1} = \theta_r^k + \dot{\theta}_r^{k+1} \Delta t,$$

wherein M, B, K are tunable control parameters, t is time, $\tau_D$ is the measured driver steering torque command, $\theta_d$ is the vehicle steering angle command, and $\theta_r$ is the impedance-adjusted vehicle steering angle command.

In one embodiment, the generating a steering command for controlling a vehicle during vehicle operations includes blending a measured driver steering torque into the torque of a lateral control system.

In one embodiment, the blending a measured driver steering torque into the torque of a lateral control system includes employing variable impedance based on type of vehicle maneuver to adjust the computed vehicle steering angle command by selecting unique values for the tunable control parameters based on the type of vehicle maneuver.

In one embodiment, the blending a measured driver steering torque into the torque of a lateral control system includes adjusting steering feel when lateral control features are active by selecting values for the tunable control parameters to improve the steering feel.

In one embodiment, the blending a measured driver steering torque into the torque of a lateral control system includes enabling a measured driver to hold an intended offset from a control path followed by a semi-autonomous driving system without disengaging the semi-autonomous driving system by selecting values for the tunable control parameters that allow the intended offset from the control path.

In one embodiment, the blending a measured driver steering torque into the torque of a lateral control system includes reducing the amount of control torque that opposes an intended override maneuver by selecting values for the tunable control parameters that reduce the amount of control torque that opposes the intended override maneuver.

In another embodiment, a system in a vehicle for generating a steering command for controlling the vehicle during vehicle operations is provided. The system includes: an impedance controller configured to generate an impedance-adjusted vehicle steering angle command based on a first vehicle steering angle command that was generated to compensate for a trajectory error, and a measured driver steering torque command generated in response to navigation of the vehicle using a vehicle steering wheel; a steering controller configured to generate the first vehicle steering control torque command while the vehicle is driven in a semi-autonomous mode, and configured to generate an impedance-adjusted vehicle steering control torque command based on a difference between the impedance-adjusted vehicle steering angle command and a measured vehicle steering angle command; and a power steering system (e.g., EPS) configured to generate the steering command based on the measured driver steering torque command and the impedance-adjusted vehicle steering control torque command; wherein the vehicle is configured to be operated in accordance with the steering command.

In one embodiment, the impedance controller is configured to generate the impedance-adjusted vehicle steering angle command based on the equation: $M(\ddot{\theta}_r - \ddot{\theta}_d) + B(\dot{\theta}_r, \dot{\theta}_d) + K(\theta_r - \theta_d) = \tau_D$, wherein M, B, K are tunable control parameters, $\tau_D$ is the measured driver steering torque command, $\theta_d$ is the vehicle steering angle command, and $\theta_r$ is the impedance-adjusted vehicle steering angle command.

In one embodiment, the impedance controller is configured to generate the impedance-adjusted vehicle steering angle command based on the s-domain equation:

$$\theta_r = \theta_d + \frac{1}{Ms^2 + Bs + K}\tau_D,$$

wherein M, B, K are tunable control parameters, $\tau_D$ is the measured driver steering torque command, $\theta_d$ is the vehicle steering angle command, and $\theta_r$ is the impedance-adjusted vehicle steering angle command.

In one embodiment, the impedance controller is configured to generate the impedance-adjusted vehicle steering angle command based on the discrete time implementation equations:

$$\ddot{\theta}_r^{k+1} = \ddot{\theta}_d^{k+1} + \frac{1}{M}\left(\tau_d^{k+1} - B(\dot{\theta}_r^k - \dot{\theta}_d^k) - K(\theta_r^k - \theta_d^k)\right);$$

$$\dot{\theta}_r^{k+1} = \dot{\theta}_r^k + \ddot{\theta}_r^{k+1}\Delta t;$$

and $$\theta_r^{k+1} = \theta_r^k + \dot{\theta}_r^{k+1}\Delta t,$$

wherein M, B, K are tunable control parameters, t is time, $\tau_D$ is the measured driver steering torque command, $\theta_d$ is the vehicle steering angle command, and $\theta_r$ is the impedance-adjusted vehicle steering angle command.

In one embodiment, the impedance controller is configured to adjust the tunable control parameters to cater to hardware differences, driving preferences and/or road conditions.

In one embodiment, the system is further configured to blend a measured driver steering torque into the torque of a lateral control system.

In one embodiment, the system is further configured to employ variable impedance based on type of vehicle maneuver to adjust the computed vehicle steering angle command, wherein to employ variable impedance based on type of vehicle maneuver the impedance controller is configured to select unique values for the tunable control parameters based on the type of vehicle maneuver.

In one embodiment, the system is further configured to adjust steering feel when lateral control features are active, wherein to adjust steering feel when lateral control features are active the impedance controller is configured to select values for the tunable control parameters to improve the steering feel.

In one embodiment, the system is further configured to allow a driver to hold an intended offset from a control path followed by a semi-autonomous driving system without disengaging the semi-autonomous driving system, wherein to allow a driver to hold an intended offset from a control path followed by a semi-autonomous driving system without disengaging the semi-autonomous driving system the impedance controller is configured to select values for the tunable control parameters to allow the intended offset from the control path.

In one embodiment, the system is further configured to reduce the amount of control torque that opposes an intended override maneuver, wherein to reduce the amount of control torque that opposes an intended override maneuver the impedance controller is configured to select values for the tunable control parameters that reduce the amount of control torque that opposes the intended override maneuver.

In another embodiment, non-transitory computer readable media encoded with programming instructions configurable to cause a processor in a vehicle to perform a method for generating a steering command for controlling the vehicle during vehicle operations is provided. The method includes: generating a first vehicle steering control torque command by a steering controller in the vehicle while the vehicle is driven in a semi-autonomous mode; generating an impedance-adjusted vehicle steering angle command based on a first vehicle steering angle command that was generated to compensate for a trajectory error, and a measured driver steering torque command generated in response to navigation of the vehicle using a vehicle steering wheel; generating an impedance-adjusted vehicle steering control torque command by the steering controller in the vehicle based on a difference between the impedance-adjusted vehicle steering angle command and a measured vehicle steering angle command; generating a steering command by a power steering system (e.g., EPS) in the vehicle based on the measured driver steering torque command and the impedance-adjusted vehicle steering control torque command; and operating the vehicle in accordance with the steering command.

In one embodiment, the generating an impedance-adjusted vehicle steering angle command includes determining the impedance-adjusted vehicle steering angle command based on the equation: $M(\ddot{\theta}_r - \ddot{\theta}_d) + B(\dot{\theta}_r - \dot{\theta}_d) + K(\theta_r - \theta_d) = \tau_D$, wherein M, B, K are tunable control parameters, $\tau_D$ is the measured driver steering torque command, $\theta_d$ is the vehicle steering angle command, and $\theta_r$ is the impedance-adjusted vehicle steering angle command.

In one embodiment, the generating a steering command for controlling the vehicle during vehicle operations comprises blending a measured driver steering torque into the steering torque of a lateral control system, and the blending a measured driver steering torque into the steering torque of a lateral control system comprises employing variable impedance based on type of vehicle maneuver to adjust the vehicle steering angle command by selecting unique values for the tunable control parameters based on the type of vehicle maneuver.

In one embodiment, the generating a steering command for controlling the vehicle during vehicle operations comprises blending a measured driver steering torque into the steering torque of a lateral control system, and the blending a measured driver steering torque into the torque of a lateral control system comprises adjusting steering feel when lateral control features are active by selecting values for the tunable control parameters to improve the steering feel.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques and articles for blending manual steering control with a driver assist or semi-autonomous driving feature such as Super Cruise, Ultra Cruise, lane keeping assist (LKA), lane departure warning (LDW), lane centering control (LCC), lane keeping support (LKS), and others without disengaging the driver assist or semi-autonomous driving feature. The following disclosure provides example systems and methods for generating a steering command for controlling a vehicle during vehicle operations that blends manual steering with a driver assist or semi-autonomous driving feature without disengaging the driver assist or semi-autonomous driving feature. The following disclosure provides an example impedance control system and algorithm for blending measured driver steering torque (derived from a steering wheel) into the torque of a trajectory system, such as a lateral control system.

Figure 1:
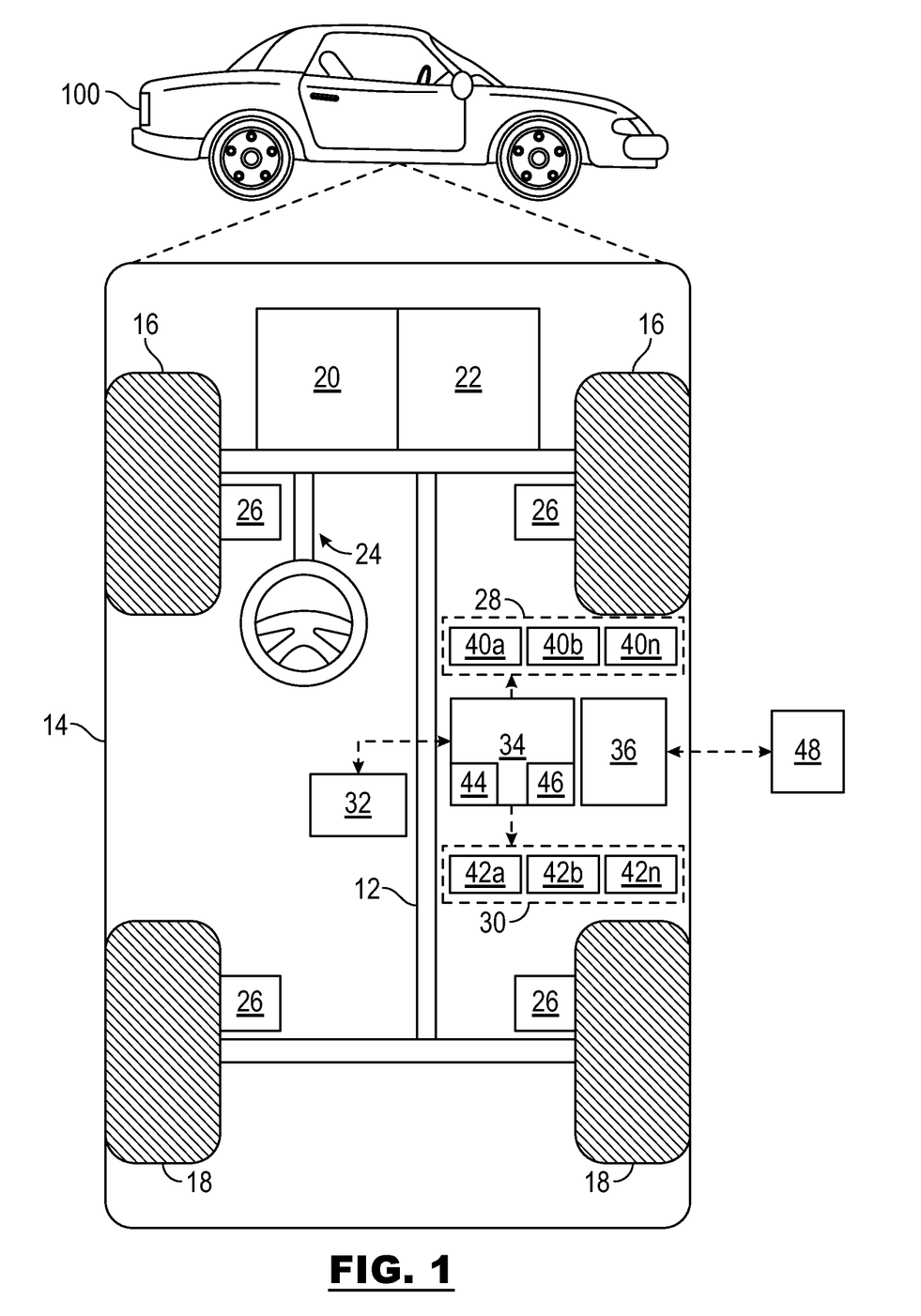
FIG. 1 is a block diagram of an example vehicle that implements an impedance controller, in accordance with various embodiments.

FIG. 1 is a block diagram of an example vehicle 100 that implements an impedance controller 214. The vehicle 100 generally includes a chassis 12, a body 14, front wheels 16, and rear wheels 18. The body 14 is arranged on the chassis 12 and substantially encloses components of the vehicle 100. The body 14 and the chassis 12 may jointly form a frame. The wheels 16-18 are each rotationally coupled to the chassis 12 near a respective corner of the body 14. The vehicle 100 is depicted in the illustrated embodiment as a passenger car, but other vehicle types, including trucks, sport utility vehicles (SUVs), recreational vehicles (RVs), etc., may also be used. The vehicle 100 is capable of being driven manually and semi-autonomously.

The vehicle 100 further includes a propulsion system 20, a transmission system 22, and a steering system 24. The steering system 24 includes a steering wheel 25 that is coupled to the wheels 16 and/or 18 through a steering column and an axle in a manner that is well understood by those skilled in the art wherein when a driver turns the steering wheel 25 the wheels 16 and/or 18 turn accordingly.

The vehicle 100 further includes a brake system 26, a sensor system 28, an actuator system 30, at least one data storage device 32, at least one controller 34, and a communication system 36 that is configured to wirelessly communicate information to and from other entities 48.

The data storage device 32 stores data for use in automatically controlling the vehicle 100. The data storage device 32 may be part of the controller 34, separate from the controller 34, or part of the controller 34 and part of a separate system. The controller 34 includes at least one processor 44 and a computer-readable storage device or media 46. Although only one controller 34 is shown in FIG. 1, embodiments of the vehicle 100 may include any number of controllers 34 that communicate over any suitable communication medium or a combination of communication mediums and that cooperate to process the sensor signals, perform logic, calculations, methods, and/or algorithms, and generate control signals to automatically control features of the vehicle 100. The controller 34, in this example, is configured to implement the impedance controller 214.

The controller 34 includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and non-volatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller. The programming instructions may include one or more separate programs, each of which comprises an ordered listing of executable instructions for implementing logical functions.

Figure 2:
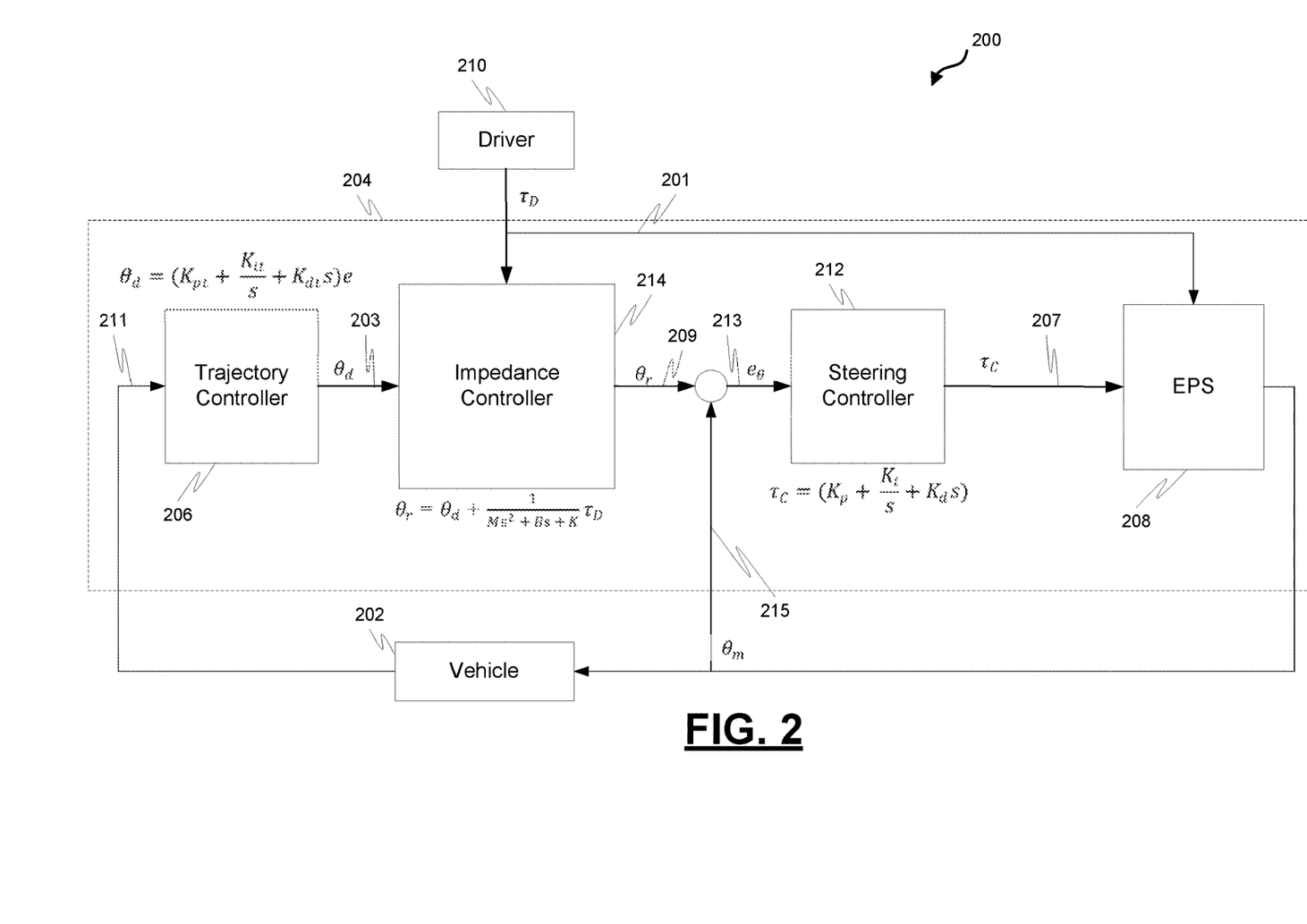
FIG. 2 is a block diagram of an example steering environment for a vehicle, in accordance with various embodiments.

FIG. 2 is a block diagram of an example steering environment 200 for a vehicle 202 (e.g., vehicle 100). The example steering environment 200 includes an example steering system 204 that influences a position of vehicle wheels (e.g., wheels 16 and/or 18).

The steering system 204 includes a trajectory controller 206 that calculates a vehicle steering angle $\theta_d$ (203) as a command to steer the vehicle 202 in accordance with a planned trajectory when the vehicle 202 is driven in autonomously or semi-autonomously. The trajectory controller 206 may implement a lateral control system and driver assist or semi-autonomous driving features such as Super Cruise, Ultra Cruise, lane keeping assist (LKA), lane departure warning (LDW), lane centering control (LCC), lane keeping support (LKS), and others.

The steering system 204 also includes a power steering system, such as an electric power steering (EPS) system 208, that provides power (e.g., electrical power) steering assist for turning vehicle wheels (e.g., wheels 16 and/or 18) in response to a vehicle driver 210 turning a steering wheel (e.g., steering wheel 25) to assist the driver 210 in steering the vehicle 202. The EPS system 208 also controls the turning of the vehicle wheels (e.g., wheels 16 and/or 18) when the vehicle 202 is driven in autonomously or semi-autonomously.

The EPS system 208 may only accept steering torque as a command, e.g., a measured driver steering torque command $\tau_D$ (201) derived from the driver 210 turning a steering wheel (e.g., steering wheel 25) and/or a control torque command $\tau_C$ (207) derived from the vehicle steering angle $\theta_d$ (203). A steering controller 212 is also included in the steering system 204 for accurately converting the vehicle steering angle $\theta_d$ (203) from the trajectory controller 206 to a steering control torque command $\tau_C$ (207) for commanding the EPS system 208.

The example steering system 204 further includes an impedance controller 214 for blending a measured driver steering torque command $\tau_D$ (201) into the control torque command $\tau_C$ (207) derived from a trajectory controller 206, such as a control torque command $\tau_C$ (207) derived from a lateral control system implemented by the trajectory controller. The example impedance controller 214 comprises a controller (e.g., controller 34) configured by programming instructions on non-transitory computer readable media to generate an impedance-adjusted vehicle steering angle command $\theta_r$ (209) based on a vehicle steering angle command $\theta_d$ (203) that was generated by the trajectory controller 206 to compensate for a trajectory error e (211) and a measured driver steering torque command $\tau_D$ (201) generated in response to navigation of the vehicle 202 by the driver 210 using a vehicle steering wheel. The example impedance controller 214 enables the EPS system 208 to generate a steering command based on the measured driver steering torque command $\tau_D$ (201) and the impedance-adjusted vehicle steering control torque command $\theta_r$ (209) to control the turning of the vehicle wheels.

The example impedance controller 214 is configured to generate the impedance-adjusted vehicle steering angle command based on the equation:

$$M(\ddot{\theta}_r - \ddot{\theta}_d) + B(\dot{\theta}_r - \dot{\theta}_d) + K(\theta_r - \theta_d) = \tau_D,$$

wherein M, B, K are tunable control parameters, $\theta_D$ is the measured driver steering torque command, $\theta_d$ is the vehicle steering angle command, and $\theta_r$ is the impedance-adjusted vehicle steering angle command.

In an s-domain representation the example impedance controller 214 may be configured to generate the impedance-adjusted vehicle steering angle command based on the s-domain equation:

$$\theta_r = \theta_d + \frac{1}{Ms^2 + Bs + K} \tau_D,$$

wherein M, B, K are tunable control parameters, $\tau_D$ is the measured driver steering torque command, $\theta_d$ is the vehicle steering angle command, and $\theta_r$ is the impedance-adjusted vehicle steering angle command.

In a discrete time representation, the example impedance controller 214 may be configured to generate the impedance-adjusted vehicle steering angle command based on the discrete time implementation equations:

$$\ddot{\theta}_r^{k+1} = \ddot{\theta}_d^{k+1} + \frac{1}{M}\left(\tau_d^{k+1} - B(\dot{\theta}_r^k - \dot{\theta}_d^k) - K(\theta_r^k - \theta_d^k)\right);$$

$$\dot{\theta}_r^{k+1} = \dot{\theta}_r^k + \ddot{\theta}_r^{k+1} \Delta t;$$

and $$\theta_r^{k+1} = \theta_r^k + \dot{\theta}_r^{k+1} \Delta t,$$

wherein M, B, K are tunable control parameters, t is time, $\tau_D$ is the measured driver steering torque command, $\theta_d$ is the vehicle steering angle command, and $\theta_r$ is the impedance-adjusted vehicle steering angle command.

In the example steering system 204, the example steering controller 212 is configured to generate a first vehicle steering control torque command $\tau_C$ (207) while the vehicle is driven in a semi-autonomous mode. In this mode, the example steering controller 212 is configured to generate the first vehicle steering control torque command $\tau_C$ (207) based on a difference $e_\theta$ (213) between the first vehicle steering angle command $\theta_d$ (203) and a measured vehicle steering angle command $\theta_m$ (215).

In the example steering system 204, the example steering controller 212 is also configured to generate an impedance-adjusted vehicle steering control torque command based on a difference $e_\theta$ (213) between the impedance-adjusted vehicle steering angle command $\theta_r$ (209) and a measured vehicle steering angle command $\theta_m$ (215). The example steering system 204 may be configured to generate the impedance-adjusted vehicle steering control torque command based on the s-domain equation:

$$\tau_C = \left(K_p + \frac{K_i}{s} + K_d s\right),$$

wherein $K_p$, $K_i$, $K_d$ are known control parameters, and $\tau_C$ is the impedance-adjusted vehicle steering control torque command. The example power steering system (e.g., EPS system 208) is configured to generate a steering command based on the measured driver steering torque command and the impedance-adjusted vehicle steering control torque command.

In the example steering system 204, the trajectory controller 206 is configured to generate the first vehicle steering angle command $\theta_d$ (203) based on the trajectory error e (211). The trajectory controller 206 may be configured to generate the vehicle steering angle command $\theta_d$ (203) based on the s-domain equation:

$$\theta_d = \left(K_{pt} + \frac{K_{it}}{s} + K_{dt}s\right)e,$$

wherein $K_{pt}$, $K_{it}$, $K_{dt}$ are known control parameters, e is the trajectory error, and $\theta_d$ is the first vehicle steering angle command.

The example impedance controller 214 can allow a steering system to blend a measured driver steering torque into the torque of a lateral control system. This can enable a lot of advanced features for a steering system with respect to lateral control.

The example impedance controller 214 is configured to provide variable impedance based on type of vehicle maneuver to allow a steering system to vary variable impedance based on type of vehicle maneuver and its effect on the computed vehicle steering angle command. To employ variable impedance based on type of vehicle maneuver, the impedance controller 214 is configured to select unique values for the tunable control parameters (M, B, K) based on the type of vehicle maneuver. For example, one set of tunable control parameters may be used while the vehicle is rounding a curve and a different set of tunable control parameters with different values may be used while the vehicle is driving on a straight away.

The example impedance controller 214 is configured to allow a steering system 204 to adjust steering feel when lateral control features are active. To adjust steering feel when lateral control features are active, the impedance controller 214 is configured to adjust the computed vehicle steering angle command by selecting unique values for the tunable control parameters (M, B, K) based on the type of vehicle maneuver. For example, the tunable control parameters may be selected to affect driver feel during various maneuvers.

The example impedance controller 214 is configured to allow a driver to hold an intended offset from a control path followed by a semi-autonomous driving system without disengaging the semi-autonomous driving system. To allow a driver to hold an intended offset from a control path followed by a semi-autonomous driving system without disengaging the semi-autonomous driving system the impedance controller 214 is configured to select values for the tunable control parameters (M, B, K) to allow the intended offset from the control path. For example, a different set of tunable control parameters may be used when the vehicle senses that the driver is attempting to hold an intended offset from the control path to make it easier for the driver to hold the offset.

The example impedance controller 214 is configured to reduce the amount of control torque that opposes an intended driver override maneuver. To reduce the amount of control torque that opposes an intended override maneuver the impedance controller 214 is configured to select values for the tunable control parameters (M, B, K) that reduce the amount of control torque that opposes the intended override maneuver. For example, a different set of tunable control parameters may be used when the vehicle senses that the driver is attempting an override maneuver to make it easier for the driver to perform the override maneuver.

The example impedance controller 214 is configured to adjust the tunable control parameters (M, B, K) to cater to hardware differences, driving preferences and road conditions. For example, a set of tunable control parameters may be selected or adjusted based on vehicle hardware configuration, a set of tunable control parameters may be selected or adjusted based on a particular driver's driving preferences, and a set of tunable control parameters may be selected or adjusted based on road conditions.

Figure 3:
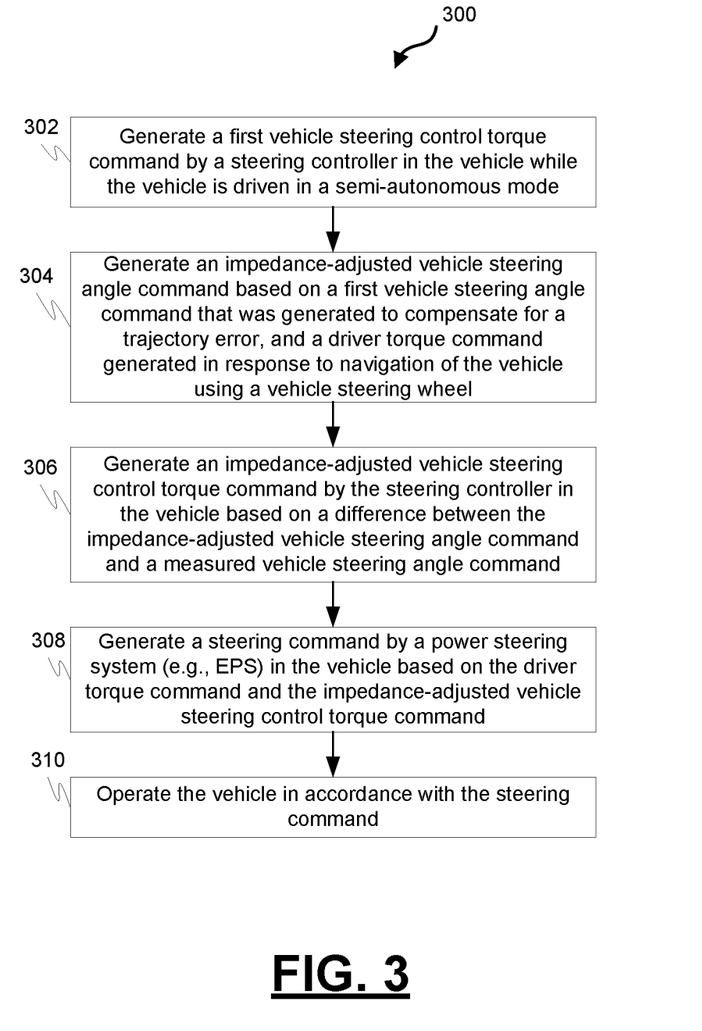
FIG. 3 is a process flow chart depicting an example process for generating a steering command for controlling a vehicle during vehicle operations, in accordance with various embodiments.

FIG. 3 is a process flow chart depicting an example process 300 for generating a steering command for controlling a vehicle during vehicle operations. The order of operation within process 300 is not limited to the sequential execution as illustrated in the FIG. 3 but may be performed in one or more varying orders as applicable and in accordance with the present disclosure.

The example process 300 includes generating a first vehicle steering control torque command by a steering controller in the vehicle while the vehicle is driven in a semi-autonomous mode (operation 302). The generating a first vehicle steering control torque command may include generating the first vehicle steering control torque command by the steering controller based on a difference between the first vehicle steering angle command and a measured vehicle steering angle command The example process 300 includes generating an impedance-adjusted vehicle steering angle command based on a first vehicle steering angle command that was generated to compensate for a trajectory error, and a measured driver steering torque command generated in response to navigation of the vehicle using a vehicle steering wheel (operation 304). The generating an impedance-adjusted vehicle steering angle command may include determining the impedance-adjusted vehicle steering angle command based on the equation: $M(\ddot{\theta}_r - \ddot{\theta}_d) + B(\dot{\theta}_r - \dot{\theta}_d) + K(\theta_r - \theta_d) = \tau_D$, wherein M, B, K are tunable control parameters, $\tau_D$ is the measured driver steering torque command, $\theta_d$ is the vehicle steering angle command, and $\theta_r$ is the impedance-adjusted vehicle steering angle command. The generating an impedance-adjusted vehicle steering angle command may comprise determining the impedance-adjusted vehicle steering angle command based on the s-domain equation:

$$\theta_r = \theta_d + \frac{1}{Ms^2 + Bs + K}\tau_D,$$

wherein M, B, K are tunable control parameters, $\tau_D$ is the measured driver steering torque command, $\theta_d$ is the vehicle steering angle command, and $\theta_r$ is the impedance-adjusted vehicle steering angle command. The generating an impedance-adjusted vehicle steering angle command may include determining the impedance-adjusted vehicle steering angle command based on the following discrete time implementation equations:

$$\ddot{\theta}_r^{k+1} = \ddot{\theta}_d^{k+1} + \frac{1}{M}\left(\tau_d^{k+1} - B(\dot{\theta}_r^k - \dot{\theta}_d^k) - K(\theta_r^k - \theta_d^k)\right);$$

$$\dot{\theta}_r^{k+1} = \dot{\theta}_r^k + \ddot{\theta}_r^{k+1}\Delta t;$$

and $$\theta_r^{k+1} = \theta_r^k + \dot{\theta}_r^{k+1}\Delta t,$$

wherein M, B, K are tunable control parameters, t is time, $\tau_D$ is the measured driver steering torque command, $\theta_d$ is the vehicle steering angle command, and $\theta_r$ is the impedance-adjusted vehicle steering angle command.

The example process 300 includes generating an impedance-adjusted vehicle steering control torque command by the steering controller in the vehicle based on a difference between the impedance-adjusted vehicle steering angle command and a measured vehicle steering angle command (operation 306). The generating an impedance-adjusted vehicle steering control torque command comprises determining the impedance-adjusted vehicle steering control torque command based on the s-domain equation:

$$\tau_C = \left(K_p + \frac{K_i}{s} + K_d s\right)e,$$

wherein $K_p$, $K_i$, $K_d$ are known control parameters, and $\tau_C$ is the impedance-adjusted vehicle steering control torque command.

The example process 300 includes generating a steering command by a power steering system (e.g., EPS) in the vehicle based on the measured driver steering torque command and the impedance-adjusted vehicle steering control torque command (operation 308). The vehicle steering angle command may be generated based on the s-domain equation:

$$\theta_d = \left(K_{pt} + \frac{K_{it}}{s} + K_{dt}s\right)e,$$

wherein $K_{pt}$, $K_{it}$, $K_{dt}$ are known control parameters, e is the trajectory error, and $\theta_d$ is the first vehicle steering angle command.

The example process 300 includes operating the vehicle in accordance with the steering command (operation 310). The generating a steering command for controlling a vehicle during vehicle operations may include blending a measured driver steering torque into the torque of a lateral control system.

The blending a measured driver steering torque into the torque of a lateral control system may include employing variable impedance based on type of vehicle maneuver to adjust the computed vehicle steering angle command. The employing variable impedance based on type of vehicle maneuver may include selecting unique values for the tunable control parameters based on the type of vehicle maneuver.

The blending a measured driver steering torque into the torque of a lateral control system may include adjusting steering feel when lateral control features are active. The adjusting steering feel when lateral control features are active may include selecting values for the tunable control parameters to improve the steering feel.

The blending a measured driver steering torque into the torque of a lateral control system may include allowing a driver to hold an intended offset from a control path followed by a semi-autonomous driving system without disengaging the semi-autonomous driving system. The allowing a driver to hold an intended offset from a control path followed by a semi-autonomous driving system without disengaging the semi-autonomous driving system may include selecting values for the tunable control parameters to allow the intended offset from the control path.

The blending a measured driver steering torque into the torque of a lateral control system may include reducing the amount of control torque that opposes an intended override maneuver. The reducing the amount of control torque that opposes an intended override maneuver may include selecting values for the tunable control parameters that reduce the amount of control torque that opposes the intended override maneuver.

Described herein are apparatus, systems, techniques and articles for blending manual steering with a driver assist or semi-autonomous driving feature such as Super Cruise, Ultra Cruise, lane keeping assist (LKA), lane departure warning (LDW), lane centering control (LCC), lane keeping support (LKS), and others without disengaging the driver assist or semi-autonomous driving feature. The described subject matter discloses apparatus, systems, techniques and articles provide for blending a driver's steering command with a control command from a trajectory control system, such as a lateral control system, without requiring precise EPS models or noise-free measurements. The described subject matter discloses apparatus, systems, techniques and articles provide for blending various types of driver/controller commands without needing to modify the power steering (e.g., EPS) type or communication protocol. The described subject matter discloses apparatus, systems, techniques and articles may allow for granting the driver adequate steering authority when needed (e.g., when driver assist and/or other semi-autonomous driving features are engaged) and an improved steering feel. The described subject matter discloses apparatus, systems, techniques and articles provide an impedance control algorithm to blend the measured driver steering torque into the torque of the lateral control system. The described subject matter discloses apparatus, systems, techniques and articles provide for blending the measured driver steering torque into the torque of the lateral control system. The described subject matter discloses apparatus, systems, techniques and articles may employ variable impedance depending on the maneuver. The described subject matter discloses apparatus, systems, techniques and articles may improve the steering feel when lateral control features are active. The described subject matter discloses apparatus, systems, techniques and articles may allow the driver to hold an intended offset from the lane center without disengaging a lane centering feature. The described subject matter discloses apparatus, systems, techniques and articles may allow for reducing the amount of control torque that opposes an intended override maneuver without disengaging a driver assist feature. The described subject matter discloses apparatus, systems, techniques and articles may work in the aforementioned ways even when the measured driver steering torque cannot be estimated with high accuracy. The described subject matter discloses apparatus, systems, techniques and articles that can generate a vehicle steering angle command based on the equation: $M(\ddot{\theta}_r-\ddot{\theta}_d)+B(\dot{\theta}_r-\dot{\theta}_d)+K(\theta_r-\theta_d)=\tau_D$, wherein M, B, K are tunable control parameters. The tunable control parameters may be selectively selected to allow for blending a driver's steering command with a control command from a trajectory control system, improving steering feel, employing variable impedance depending on the maneuver, allowing a driver to hold an intended offset from a lane center without disengaging a lane centering feature, allow for reducing the amount of control torque that opposes an intended override maneuver without disengaging a driver assist feature, and/or allow for accomplishing the aforementioned features when measured driver steering torque cannot be estimated with high accuracy.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for generating a steering command for controlling a vehicle during vehicle operations, the method comprising:
   generating a first vehicle steering control torque command by a steering controller in the vehicle while the vehicle is driven in a semi-autonomous mode;
   generating an impedance-adjusted vehicle steering angle command ($\theta_r$) based on a first vehicle steering angle command ($\theta_d$) that was generated to compensate for a trajectory error, a first derivative of the vehicle steering angle command ($\dot{\theta}_d$), a second derivative of the vehicle steering angle command ($\ddot{\theta}_d$), and a measured driver steering torque command ($\tau_D$) generated in response to navigation of the vehicle using a vehicle steering wheel;
   generating an impedance-adjusted vehicle steering control torque command ($\tau_C$) by the steering controller in the vehicle based on a difference between the impedance-adjusted vehicle steering angle command ($\theta_r$) and a measured vehicle steering angle command ($\theta_m$);
   generating a steering command by a power steering system in the vehicle based on the measured driver steering torque command ($\tau_D$) and the impedance-adjusted vehicle steering control torque command ($\tau_C$); and
   operating the vehicle in accordance with the steering command.

2. The method of claim 1, wherein the generating an impedance-adjusted vehicle steering angle command comprises determining the impedance-adjusted vehicle steering angle command based on the equation: $M(\ddot{\theta}_r-\ddot{\theta}_d)+B(\dot{\theta}_r-\dot{\theta}_d)+K(\theta_r-\theta_d)=\tau_D$, wherein M, B, K are tunable parameters, $\tau_D$ is the measured driver steering torque command, $\theta_d$ is the vehicle steering angle command, and $\theta_r$ is the impedance-adjusted vehicle steering angle command.

3. The method of claim 2, wherein the generating the impedance-adjusted vehicle steering angle command comprises determining the impedance-adjusted vehicle steering angle command based on the s-domain equation:

$$\theta_r = \theta_d + \frac{1}{Ms^2 + Bs + K}\tau_D,$$

wherein M, B, K are tunable parameters, $\tau_D$ is the measured driver steering torque command, $\theta_d$ is the vehicle steering angle command, and $\theta_r$ is the impedance-adjusted vehicle steering angle command.

4. The method of claim 2, wherein the generating a steering command for controlling a vehicle during vehicle operations comprises blending a measured driver steering torque into the steering torque of a lateral control system.

5. The method of claim 4, wherein the blending a measured driver steering torque into the steering torque of a lateral control system comprises employing variable impedance based on type of vehicle maneuver to adjust the vehicle steering angle command by selecting unique values for the tunable parameters based on the type of vehicle maneuver.

6. The method of claim 4, wherein the blending a measured driver steering torque into the torque of a lateral control system comprises adjusting steering feel when lateral control features are active by selecting values for the tunable parameters to improve the steering feel.

7. The method of claim 4, wherein the blending a measured driver steering torque into the steering torque of a lateral control system comprises enabling a driver to hold an intended offset from a control path followed by a semi-autonomous driving system without disengaging the semi-autonomous driving system by selecting values for the tunable parameters that allow the intended offset from the control path.

8. The method of claim 4, wherein the blending a measured driver steering torque into the steering torque of a lateral control system comprises reducing an amount of control torque that opposes an intended override maneuver by selecting values for the tunable parameters that reduce the amount of control torque that opposes the intended override maneuver.

9. A system in a vehicle for generating a steering command for controlling the vehicle during vehicle operations, the system comprising:
   an impedance controller configured to generate an impedance-adjusted vehicle steering angle command ($\theta_r$) based on a first vehicle steering angle command ($\theta_d$) that was generated to compensate for a trajectory error, a first derivative of the vehicle steering angle command ($\dot{\theta}_d$), a second derivative of the vehicle steering angle command ($\ddot{\theta}_d$), and a measured driver steering torque command ($\tau_D$) generated in response to navigation of the vehicle using a vehicle steering wheel;
   a steering controller configured to generate a first vehicle steering control torque command while the vehicle is driven in a semi-autonomous mode, and configured to generate an impedance-adjusted vehicle steering control torque command ($\tau_C$) based on a difference between the impedance-adjusted vehicle steering angle command ($\theta_r$) and a measured vehicle steering angle command ($\theta_m$); and a power steering system configured to generate the steering command based on the measured driver steering torque command ($\tau_D$) and the impedance-adjusted vehicle steering control torque command ($\tau_C$);

wherein the vehicle is configured to be operated in accordance with the steering command.

10. The system of claim 9, wherein the impedance controller is configured to generate the impedance-adjusted vehicle steering angle command based on the equation: $M(\ddot{\theta}_r-\ddot{\theta}_d)+B(\dot{\theta}_r-\dot{\theta}_d)+K(\theta_r-\theta_d)=\tau_D$, wherein M, B, K are tunable parameters, $\tau_D$ is the measured driver steering torque command, $\theta_d$ is the vehicle steering angle command, and $\theta_r$ is the impedance-adjusted vehicle steering angle command.

11. The system of claim 10, wherein the impedance controller is configured to generate the impedance-adjusted vehicle steering angle command based on the s-domain equation:

$$\theta_r = \theta_d + \frac{1}{Ms^2 + Bs + K}\tau_D,$$

wherein M, B, K are tunable parameters, $\tau_D$ is the measured driver steering torque command, $\theta_d$ is the vehicle steering angle command, and $\theta_r$ is the impedance-adjusted vehicle steering angle command.

12. The system of claim 10, wherein the impedance controller is configured to adjust the tunable parameters to cater to hardware differences, driving preferences and/or road conditions.

13. The system of claim 10, further configured to employ variable impedance based on type of vehicle maneuver to adjust the vehicle steering angle command, wherein to employ variable impedance based on type of vehicle maneuver the impedance controller is configured to select unique values for the tunable parameters based on the type of vehicle maneuver.

14. The system of claim 10, further configured to adjust steering feel when lateral control features are active, wherein to adjust steering feel when lateral control features are active the impedance controller is configured to select values for the tunable parameters to improve the steering feel.

15. The system of claim 10, further configured to allow a driver to hold an intended offset from a control path followed by a semi-autonomous driving system without disengaging the semi-autonomous driving system, wherein to allow a driver to hold an intended offset from a control path followed by a semi-autonomous driving system without disengaging the semi-autonomous driving system the impedance controller is configured to select values for the tunable parameters to allow the intended offset from the control path.

16. The system of claim 10, further configured to reduce an amount of steering control torque that opposes an intended override maneuver, wherein to reduce the amount of control torque that opposes an intended override maneuver the impedance controller is configured to select values for the tunable parameters that reduce the amount of control torque that opposes the intended override maneuver.

17. Non-transitory computer readable media encoded with programming instructions configurable to cause a processor in a vehicle to perform a method for generating a steering command for controlling the vehicle during vehicle operations, the method comprising:

generating a first vehicle steering control torque command by a steering controller in the vehicle while the vehicle is driven in a semi-autonomous mode;

generating an impedance-adjusted vehicle steering angle command ($\theta_r$) based on a first vehicle steering angle command ($\theta_d$) that was generated to compensate for a trajectory error, a first derivative of the vehicle steering angle command ($\dot{\theta}_d$), a second derivative of the vehicle steering angle command ($\ddot{\theta}_d$), and a measured driver steering torque command ($\tau_D$) generated in response to navigation of the vehicle using a vehicle steering wheel;

generating an impedance-adjusted vehicle steering control torque command ($\tau_C$) by the steering controller in the vehicle based on a difference between the impedance-adjusted vehicle steering angle command ($\theta_r$) and a measured vehicle steering angle command ($\theta_m$);

generating a steering command by a power steering system in the vehicle based on the measured driver steering torque command ($\tau_D$) and the impedance-adjusted vehicle steering control torque command ($\tau_C$); and operating the vehicle in accordance with the steering command.

18. The non-transitory computer readable media of claim 17, wherein the generating an impedance-adjusted vehicle steering angle command comprises determining the impedance-adjusted vehicle steering angle command based on the equation: $M(\ddot{\theta}_r-\ddot{\theta}_d)+B(\dot{\theta}_r-\dot{\theta}_d)+K(\theta_r-\theta_d)=\tau_D$, wherein M, B, K are tunable parameters, $\tau_D$ is the measured driver steering torque command, $\theta_d$ is the vehicle steering angle command, and $\theta_r$ is the impedance-adjusted vehicle steering angle command.

19. The non-transitory computer readable media of claim 18, wherein the generating a steering command for controlling the vehicle during vehicle operations comprises blending a measured driver steering torque into the steering torque of a lateral control system, wherein the blending a measured driver steering torque into the steering torque of a lateral control system comprises employing variable impedance based on type of vehicle maneuver to adjust the vehicle steering angle command by selecting unique values for the tunable parameters based on the type of vehicle maneuver.

20. The non-transitory computer readable media of claim 18, wherein the generating a steering command for controlling the vehicle during vehicle operations comprises blending a measured driver steering torque into the steering torque of a lateral control system, wherein the blending a measured driver steering torque into the torque of a lateral control system comprises adjusting steering feel when lateral control features are active by selecting values for the tunable parameters to improve the steering feel.

* * * * *